(12) United States Patent
Wilson et al.

(10) Patent No.: US 7,293,075 B2
(45) Date of Patent: Nov. 6, 2007

(54) METHOD AND APPARATUS FOR OPERATING A DATA PROCESSING SYSTEM USING MULTIPLE CONSOLE VIEWS

(75) Inventors: Kristine J. Wilson, Arden Hills, MN (US); Mark A. Wiggins, St. Paul, MN (US); Gail L. Johnson, White Bear Lake, MN (US); Kate H. Tsai, Champlin, MN (US)

(73) Assignee: Unisys Corporation, Blue Bell, PA (US)

( * ) Notice: Subject to any disclaimer, the term of this patent is extended or adjusted under 35 U.S.C. 154(b) by 1029 days.

(21) Appl. No.: 09/833,943

(22) Filed: Apr. 12, 2001

(65) Prior Publication Data

US 2002/0156873 A1 Oct. 24, 2002

(51) Int. Cl.
G06F 3/00 (2006.01)
G06F 15/16 (2006.01)

(52) U.S. Cl. .................. 709/219; 709/227; 715/740
(58) Field of Classification Search ............... 717/134, 717/138; 709/200–205, 217–219, 227–229; 710/73, 62, 100, 220; 715/740
See application file for complete search history.

(56) References Cited

U.S. PATENT DOCUMENTS

| | | | | |
|---|---|---|---|---|
| 5,315,711 A | * | 5/1994 | Barone et al. ............... | 709/208 |
| 5,339,450 A | | 8/1994 | Nagahara | |
| 5,553,292 A | * | 9/1996 | Daly et al. .................. | 710/260 |
| 5,592,676 A | * | 1/1997 | Bonnafoux ................. | 717/109 |
| 5,968,119 A | * | 10/1999 | Stedman et al. ............ | 709/219 |
| 6,047,319 A | * | 4/2000 | Olson ......................... | 709/223 |
| 6,049,832 A | * | 4/2000 | Brim et al. ................. | 709/237 |
| 6,157,944 A | * | 12/2000 | Pedersen ..................... | 709/204 |
| 6,195,091 B1 | * | 2/2001 | Harple et al. ............... | 345/751 |
| 6,216,159 B1 | * | 4/2001 | Chintakrindi et al. ....... | 709/220 |
| 6,216,164 B1 | * | 4/2001 | Zaremba, Jr. ............... | 709/227 |
| 6,230,171 B1 | * | 5/2001 | Pacifici et al. .............. | 715/512 |

(Continued)

OTHER PUBLICATIONS

XP-002206777—InDepth—Using xinetd, Mar. 2001.

(Continued)

*Primary Examiner*—Joseph E. Avellino
(74) *Attorney, Agent, or Firm*—Robert Marley; Beth L. McMahon; Crawford Maunu PLLC (57) ABSTRACT

Method and apparatus for operating a data processing system. The data processing system hosts an operating system that is coupled to a management interface processor, wherein the management interface processor is coupled to a network having a plurality of computer systems coupled thereto. One or more instances of an independently operable console view are initiated on one or more of the computer systems, and one or more logical console objects are instantiated on the management interface processor. On selected ones of the computer systems, one or more instances of a system operations program are configured to transmit data received from a console view to the logical console object and transmit data received from a logical console object to one or more instances of a console view. The instances of the system operations program are coupled to the logical console objects, respectively, and in response to user-initiated connection requests for each of the one or more instances of the console view, each instance of the console view is coupled to a selected instance of the system operations program.

18 Claims, 7 Drawing Sheets

U.S. PATENT DOCUMENTS

| | | | |
|---|---|---|---|
| 6,240,444 B1* | 5/2001 | Fin et al. | 709/205 |
| 6,256,014 B1* | 7/2001 | Thomas et al. | 345/163 |
| 6,304,895 B1* | 10/2001 | Schneider et al. | 709/203 |
| 6,378,009 B1* | 4/2002 | Pinkston et al. | 710/62 |
| 6,539,418 B2* | 3/2003 | Schneider et al. | 709/203 |
| 6,647,508 B2* | 11/2003 | Zalewski et al. | 714/3 |
| 6,662,210 B1* | 12/2003 | Carleton et al. | 709/204 |
| 6,671,756 B1* | 12/2003 | Thomas et al. | 710/73 |
| 6,681,250 B1* | 1/2004 | Thomas et al. | 709/226 |
| 6,728,553 B1* | 4/2004 | Lehmus et al. | 455/558 |
| 6,728,764 B1* | 4/2004 | Wilson et al. | 709/220 |
| 6,732,216 B2* | 5/2004 | Shaw | 710/305 |
| 6,802,068 B1* | 10/2004 | Guruprasad | 719/319 |
| 6,836,787 B1* | 12/2004 | Kasai et al. | 709/204 |
| 6,963,786 B2* | 11/2005 | Ogushi et al. | 700/108 |
| 7,120,433 B2* | 10/2006 | Gladwin et al. | 455/426.1 |
| 7,130,888 B1* | 10/2006 | Hickman et al. | 709/208 |
| 2002/0069284 A1* | 6/2002 | Slemmer et al. | 709/227 |

OTHER PUBLICATIONS

XP-002207581—Using Shared Interface Objects to Support Cooperation—Gareth Smith, Tom Rodden, 1994.

XP-10092501—User Interface Standards for Control System Design Applications—H.A. Barker,, M. Chen, I.T. Harvey, P.W. Grant, C.P. Jobling, A. Parkman, and P. Townsend, © 1989.

XP 000079004—XSCOPE: A Debugging and Performance Tool for XII—James L. Peterson, Sep. 1989.

* cited by examiner

METHOD AND APPARATUS FOR OPERATING A DATA PROCESSING SYSTEM USING MULTIPLE CONSOLE VIEWS

FIELD OF THE INVENTION

The present invention generally relates to the operation of data processing systems, and more particularly to remote and distributed operation of a data processing system.

BACKGROUND OF THE INVENTION

Data processing systems have historically required operator control for the day to day operations of the host processor. Prior art system operations interfaces have included an operation console directly coupled to the system. A typical console included a keyboard for entry of control commands, a plurality of selector switches, one or more banks of indicator lamps, and a CRT display for providing system status information to the operator.

In various instances, the operation console is the means through which an operator can enter commands to the operating system. In addition, the operator can monitor messages coming from the operating system. This permits the operator to gather system information and undertake a number of tasks, ranging from booting or restarting the system to user and file management.

In systems such as the 2200 Series data processing systems from Unisys, multiple operations consoles can be configured, each supporting a different operational function with respect to the system. For example, separate consoles can be configured for magnetic tape management, user management, and file management. For each console, a physical hardware device has historically been required.

Products such as the Single Point Operations (SPO) software available from Unisys Corporation have provided a centralized and a remote interface for operating data processing systems. In a system having multiple operations consoles, the SPO software supports a remote and centralized interface for interacting with the multiple consoles via a network. A network couples the workstation that hosts the SPO software to the hardware devices that implement the separate consoles. The SPO arrangement, as well as other arrangements, have relied on the presence of physical devices for the consoles, thereby adding to hardware and software maintenance costs.

A method and apparatus that addresses the aforementioned problems, as well as other related problems, are therefore desirable.

SUMMARY OF THE INVENTION

In various embodiments, the invention provides a method and apparatus for operating a data processing system. The data processing system hosts an operating system that is coupled to a management interface processor, wherein the management interface processor is coupled to a network having a plurality of computer systems coupled thereto. One or more instances of an independently operable console view are initiated on one or more of the computer systems, and one or more logical console objects are instantiated on the management interface processor. On selected ones of the computer systems, one or more instances of a system operations program are configured to transmit data received from a console view to the logical console object and transmit data received from a logical console object to one or more instances of a console view. The instances of the system operations program are coupled to the logical console objects, respectively, and in response to user-initiated connection requests for each of the one or more instances of the console view, each instance of the console view is coupled to a selected instance of the system operations program.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

In various embodiments of the invention, a method and apparatus are provided for operating a data processing system. A management interface processor is coupled to the operating system(s) of one or more data processing systems. For example, some data processing systems, such as CPIX Series systems from Unisys, can be partitioned into multiple, independent data processing systems (each referred to as a "partition"). The management interface processor hosts one or more logical console objects for the respective partitions of the data processing system.

The logical console objects are coupled, via a network for example, to instances of system operations programs that execute on various computer systems on the network. The system operations programs are portable across computer systems and manage the interface with the operating system. The separation of the logical console objects from the instances of the system operations programs provides flexibility in deploying the instances on suitable computer systems on the network. Thus, the workload can be balanced between computer systems and operators. Furthermore, upon failure of a computer system the system operations program can be restarted on another computer system.

Figure 1:
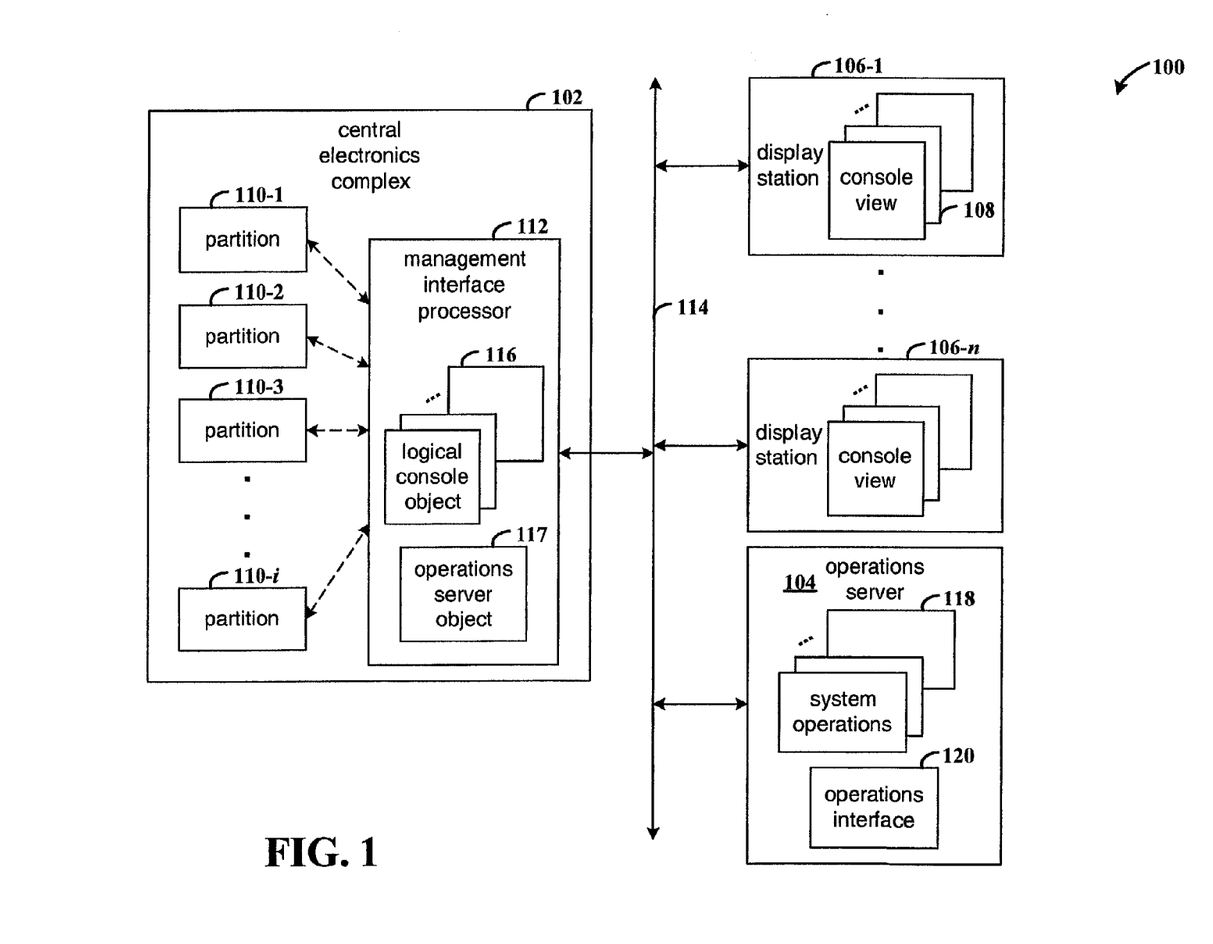
FIG. 1 is a functional block diagram of a data processing system that is operable via one or more logical console objects and one or more instances of console views in accordance with one embodiment of the invention.

FIG. 1 is a functional block diagram of a data processing arrangement including a data processing system that is operable via a plurality of logical consoles in accordance with one embodiment of the invention. Data processing arrangement 100 includes a central electronics complex 102, operations server 104, and multiple display stations 106-1-106-n. The console views 108 provide the user interface for operations of the systems defined by partitions 110-1-110-i.

In one embodiment, central electronics complex 102 is a large-scale data processing system, such as the CPIX Series data processing systems from Unisys. Central electronics complex 102 can be configured into multiple partitions 110-1-110-i. Each of the partitions is itself a data processing system that is controlled by an instance of an operating system (not shown).

Management interface processor 112, in one embodiment, is a Windows NT computer that is disposed in the cabinetry (not shown) that encases central electronics complex 102. Other hardware and software combinations may be suitable for implementing the management interface processor in other embodiments. Each of partitions 110-1-110-i is coupled to management interface processor 112, and the instances of the operating systems executing on the partitions are coupled to software that executes on the management interface processor 112. The management interface processor also includes a network interface (not shown) for connecting to network 114.

Management interface processor 112 hosts object-oriented software that instantiates logical console objects 116 and one or more operations server objects 117. The operating system on each of partitions 110-1-110-i may have one or more associated logical console objects, depending on partition-specific configuration characteristics. For example, some partitions may be configured to have dedicated operations consoles for viewing and managing messages directed to the handling of magnetic tapes.

Management interface processor 112 provides a communication path between the operating systems of the various partitions 110-1-110-i and the instances of the system operations program 118. When a console is created, a logical console object is instantiated, and the logical console object is connected to an instance of a system operations program when the console is activated. In the interest of brevity, an instance of the system operation program will sometimes be referred to as the "logical console." This should not be confused with the logical console object that is hosted on the management interface processor 112. The process for creating and activating logical consoles is described in the application/patent, entitled, "METHOD AND APPARATUS FOR OPERATING A DATA PROCESSING SYSTEM" by Wilson et al., which was filed on Nov. 8, 2000 and having application/patent Ser. No. 09/708,323.

The logical console objects 116 are associated with respective instances of system operations program 118. An instance of a system operations program manages message transfer between an associated logical console and one or more console views 108, and in another embodiment supports automation of system operations. In one embodiment, the system operations program implements the capabilities found in the Friendly Console and Auto-action Message System software components that are available from Unisys. The instances of the system operations program are hosted on one or more data processing systems, for example workstation-class machines, and are launched by the operations interface program 120. Each operations server 104 that hosts one or more instances of a system operations program also hosts an operations interface program.

The operations interface program 120 manages the instances of the system operations program operating on the same operations server 104. In response to control directives from management interface processor 112, instances of system operations program 118 are started and stopped by operations interface 120. In addition, connection status messages are sent between the operations interface and the corresponding operations server object 117 on the management interface processor for the purpose of maintaining a mapping of the logical console objects and the operations server(s) 104 hosting the associated instance of the system operations program. That is, the management interface processor tracks which logical consoles are associated with which partitions and on which operations server 104 the instances of the system operations program execute.

The console views 108 are GUIs that support manual operation of the data processing system(s). More than one console view may be open for a particular logical console, and input commands/data can be entered from any of the views. In one embodiment, the console views are implemented as X-windows, and the display stations are workstation-class data processing systems.

It will be appreciated that the logical nature of the console objects 116 and the portability of the console views 108, instances of system operations 118, and operations interface program enhances flexibility in the operation of partitions 110-1-110-i. For example, network 114 may be a LAN, WAN, or world-wide network, thereby offering remote operations of the partitions. In addition, the operations interface 120 may be hosted on a number of computer systems, thereby distributing the workload, both from a computational resource perspective and from an operator perspective.

Socket-based communication is used between the various components in arrangement 100, thereby permitting the components to be distributed across the network. In an alternative embodiment, Microsoft's DCOM can be used.

Figure 2:
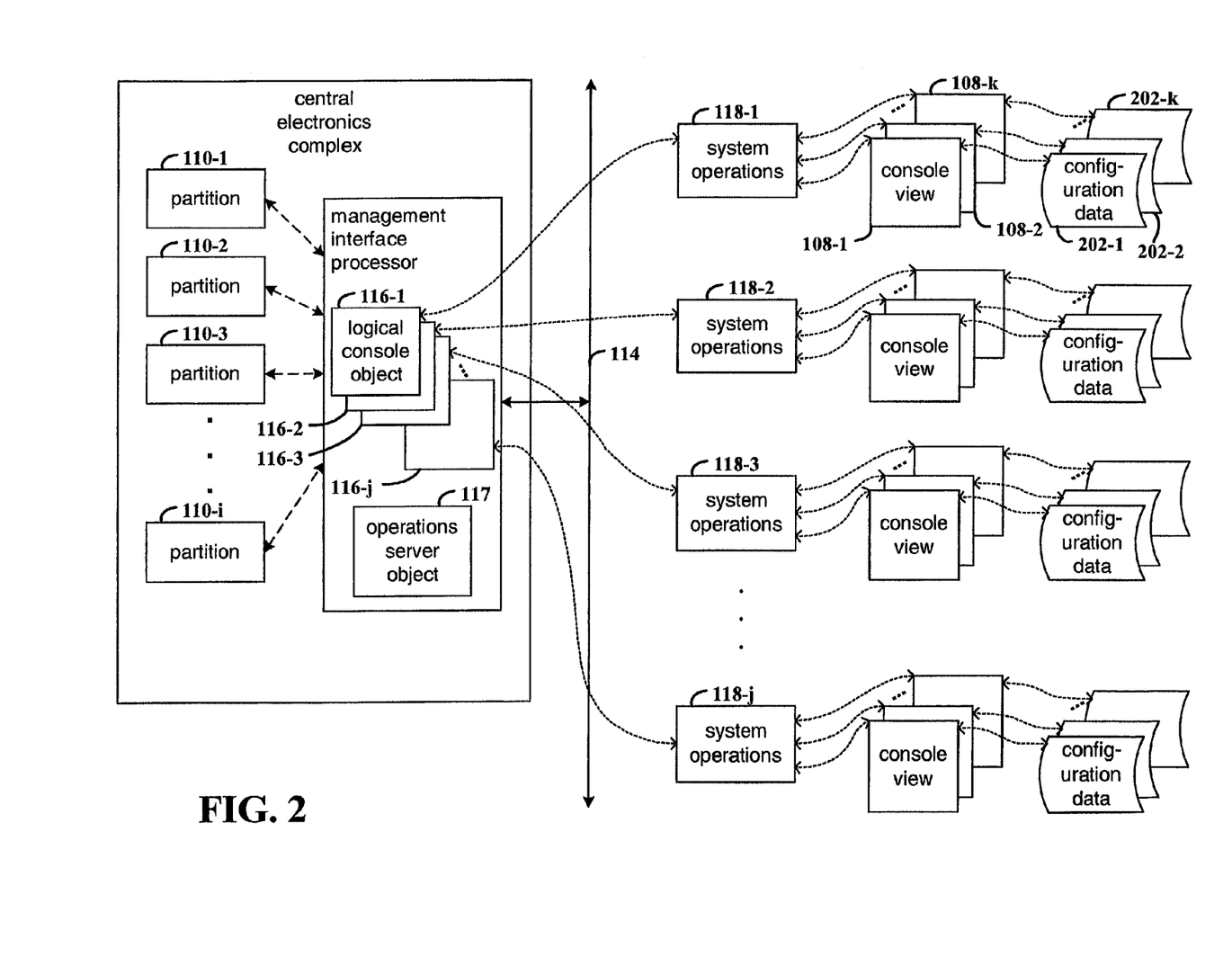
FIG. 2 is a functional block diagram illustrating the relationships between logical console objects, instances of system operations programs, and instances of console views.

FIG. 2 is a functional block diagram illustrating the relationships between logical console objects, instances of system operations programs, and instances of console views. Each of logical console objects 116-1-116-j is coupled to one of the instances of system operations programs 118-1-118-j, as shown by the dotted, bi-directional lines.

Each of the instances of the system operations program is coupled to one or more instances of associated ones of a console view 108-1-108-k. The system that hosts an instance of a console view does not have to be the same system that hosts the coupled instance of the system operations program. For example, console view 108-1 may be hosted by a first system, and the coupled instance of the system operations program may be hosted by a second system. Alternatively, console view and the associated instance of a system operations program may be hosted on the same system.

Each instance of a console view has an associated set of configuration data. For example, console views 108-1-108-k have associated therewith configuration data sets 202-1-202-k. Each configuration data set specifies display characteristics for the associated console view. The display characteristics include, for example, screen colors, fonts, and criteria for selectively displaying data received from a logical console object. Thus, users can independently tailor each console view to suit unique operational requirements.

A connection between a console view and an instance of a system operations program is established in response to user interaction with the console view. In response to a user selection that specifies a console (logical console object/partition name/system name), the console view connects to an instance of the system operations program. This allows a single console view to be used as the console user interface for different systems.

An instance of the system operations program receives user-input commands/data from a connected console view and processes it or forwards the commands/data to the host, independent from any other connected consoles views. Thus, each console view that is connected to a given instance of a system operations program has a channel for providing input commands/data to the system operations program or host without interference from other input commands/data from other console views. Input control for the keyboard and mouse are not shared; commands/data entered at one console view are not replicated at another console view. However, where two console views are connected to the same instance of a system operations program, output data are routed to both console views, each displaying the data according to its own configuration parameters. The output data includes echo of host commands and the host-generated results or system operations program-generated results from all commands/data input at the console views.

Figure 3:
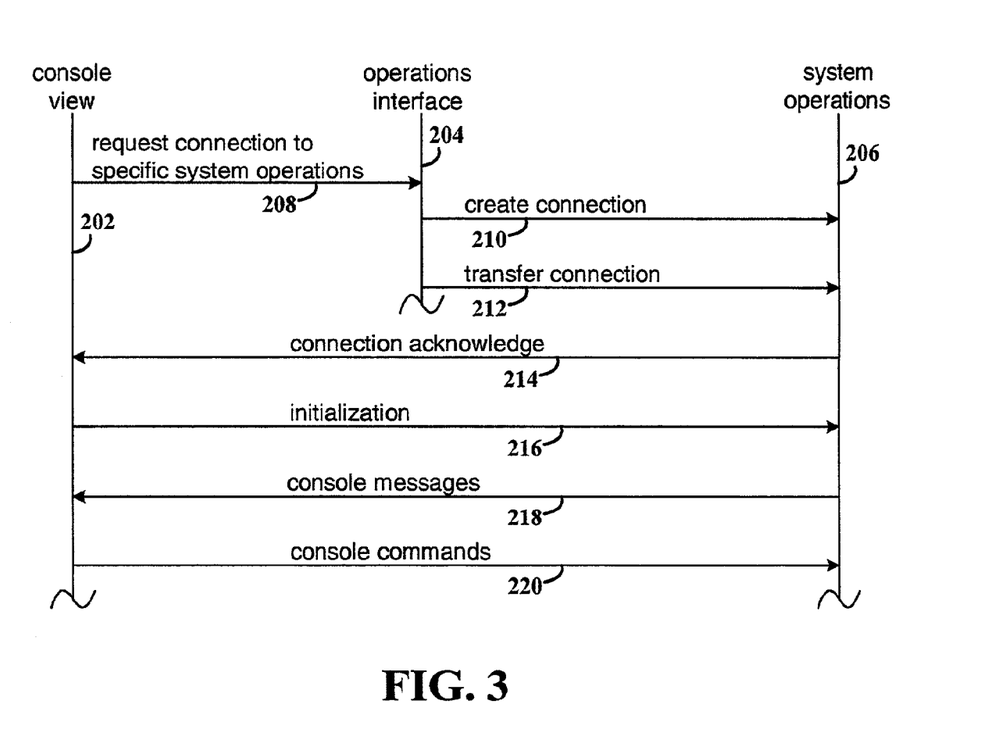
FIG. 3 is an interaction diagram that illustrates interactions between an instance of a console view, an operations interface, and an instance of system operations.

FIG. 3 is an interaction diagram that illustrates interactions between an instance of a console view, an operations interface, and an instance of system operations. The vertical lines 202, 204, and 206 illustrate execution of an instance of a console view, an instance of an operations interface, and an instance of a system operations program.

The interaction begins with the console view transmitting to the operations interface a request for a connection (line 208) to an instance of a system operations program. The user initiates the request by specifying a system name (102), partition name (110), and a console name (116) that were configured at system installation. The request identifies a particular instance of the system operations program and is made via a socket-based connection in one embodiment. The operations interface, in response to the connection request, creates a connection (line 210) with the specified instance of the system operations program. For example, in one embodiment a socket-based connection is created. Then the operations interface transfers its socket connection with the console view to the instance of the system operations program (line 212).

The system operations program acknowledges the connection in a message sent to the console view (214), and the console view transmits an initialization request to the system operations program (line 216). In response to the initialization request, the system operations program transmits console data, for example, messages from the host data processing system, to the console view (line 218).

User-entered commands are transmitted from the console view to the system operations program (line 220). While not shown, it will be appreciated that the commands are then transmitted to the connected logical console object, which in turn forwards the command to the appropriate one of partitions 110-1-110-i. The system operations program does not replicate in one instance of the console view keystrokes and mouse movements that are entered by another instance of the console view. Thus, a user interacting with one console view will not see user interaction that is entered from other console views. However, output messages and other results of commands from the host or system operations program are sent from the instance of the system operations program to all connected console views, and each console view displays the messages and results in a manner specified by the associated configuration data set.

Figure 4:
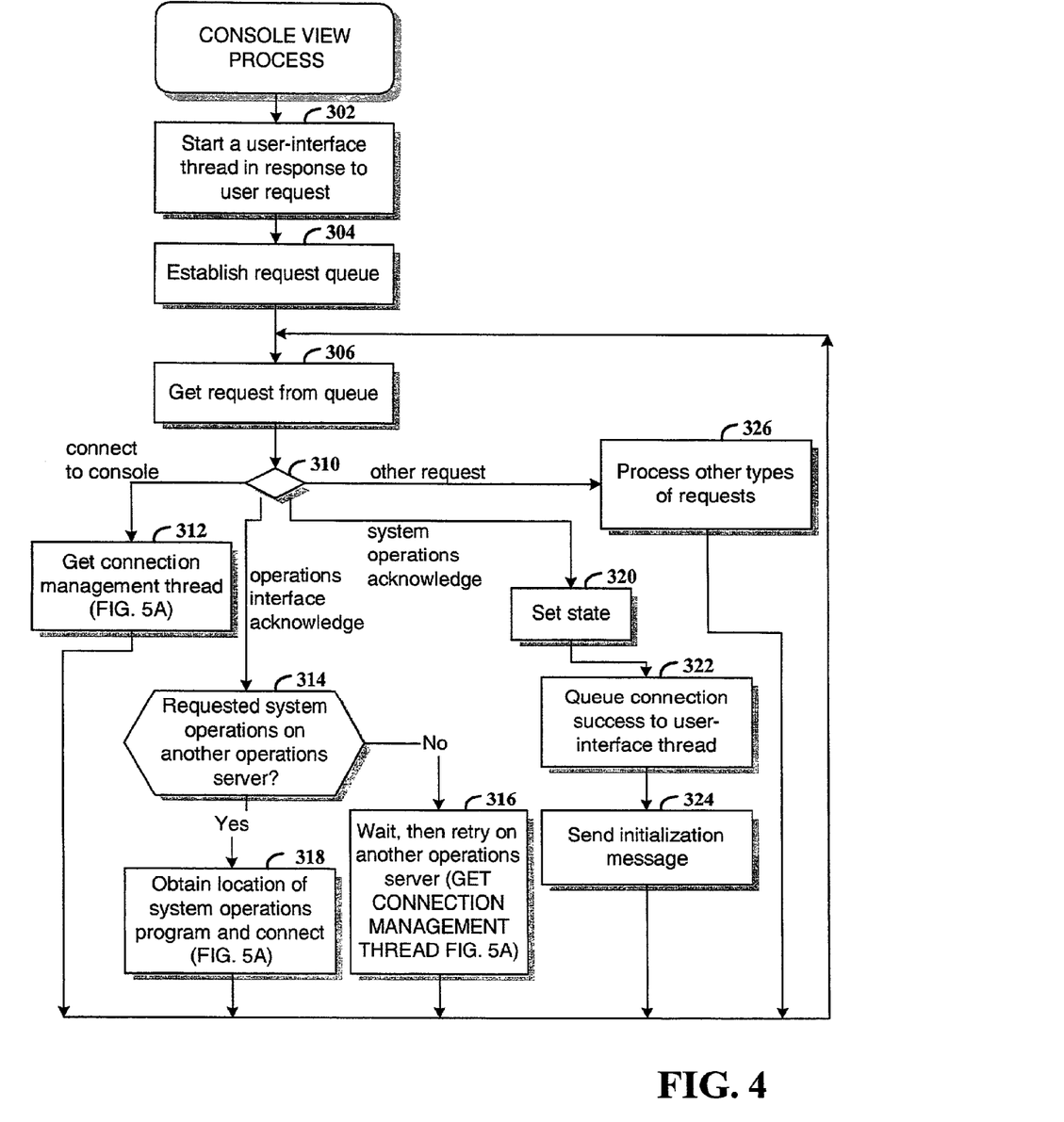
FIG. 4 is a flowchart of a process that implements an instance of a console view in accordance with an example embodiment of the invention.

FIG. 4 is a flowchart of a process that implements an instance of a console view in accordance with an example embodiment of the invention. The process generally entails processing user requests from a request queue.

At step 302, a user-interface thread is started in response to a user request. A request queue is established at step 304, and at step 306 a request is removed from the queue for processing. The user-interface thread coordinates interaction with a user. For example, the user-interface thread reads commands, control key selections, and responses to messages (from the host) and responds accordingly. For example, a control key selection may invoke a menu-driven interface, while a command is entered as a request to be processed by the console view process. From the user-interface thread, the user also enters various connection management directives.

Decision step 310 directs the process according to the type of request. For a request to connect to a console, the process is directed to step 312. At step 312, the process obtains a connection management thread, as described in FIG. 5A. The connection management thread handles the task of establishing a connection between the instance of the console view and the requested instance of the system operations program. Control is then returned to step 306 to get the next request from the queue.

If the request is an acknowledgment from the operations interface (120, FIG. 1), the process is directed to decision step 314. When an acknowledgment is received from the operations interface instead of the system operations program, this indicates that the console does not exist on this operations server. Decision step 314 tests whether the requested instance of the system operations program is hosted on another operations server. If not, this indicates a connection failure (e.g., the requested console is inactive or not ready to receive a connection), and the process is directed to step 316. At step 316, the console view process waits for a selected period of time and retries a connection with another operations server (invokes the Get Connection Management Thread process of FIG. 5A). If the requested instance of the system operations program is hosted on another operations server, step 318 obtains the location of the system operations program and connects (invokes the Get Connection Management Thread process of FIG. 5A). The process then returns to step 306 to get the next request from the request queue.

If the request is an acknowledgment from the connected instance of the system operations program, the process is directed to step 320. At step 320, the state of the console view process is set to indicate "connected". At step 322, a connection-success message is queued to the user-interface thread. In response the user-interface thread informs the user that the connection has been established. The console view process then sends an initialization message to the connected instance of the system operations program at step 324 and returns to step 306 to get the next request from the request queue.

Decision step 310 directs the process to step 326 for other types of requests in the request queue include, for example, input commands from the user. At step 326, these types of requests are processed in accordance with the type of request. Commands are transmitted to the instance of the system operations program. The process then returns to step 306 to get the next request from queue. Other types of requests include, for example, configuration changes (changes in color mapping, message suppression control, etc.) and input commands processed by the system operations program, such as changes to auto-response features and display control of selected host messages.

Figure 5A:
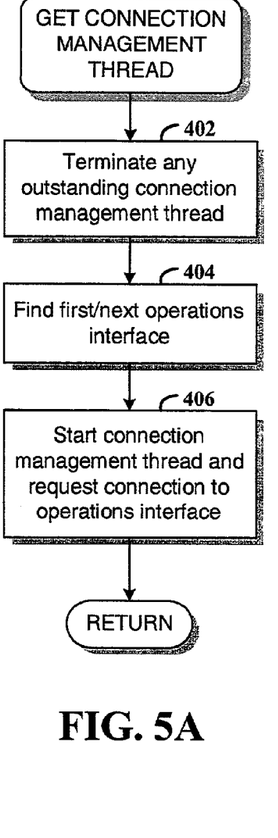
FIG. 5A is a flowchart of a process for obtaining a connection management thread.

FIG. 5A is a flowchart of a process for obtaining a connection management thread. At step 402, any previously created connection management thread of the console view is terminated. An instance of the operations interface is selected at step 404. The process for getting a connection management thread selects an operations interface based on a list of currently executing instances of the operations interface and with which instances of the operations interface a connection was previously sought.

At step 406, a connection management thread (FIG. 5B) is started and a request is made to connect to the selected instance of the operations interface. The request is queued to the connection queue of the operations interface (FIG. 6, 484). The process then returns control to the console view process (FIG. 4).

Figure 5B:
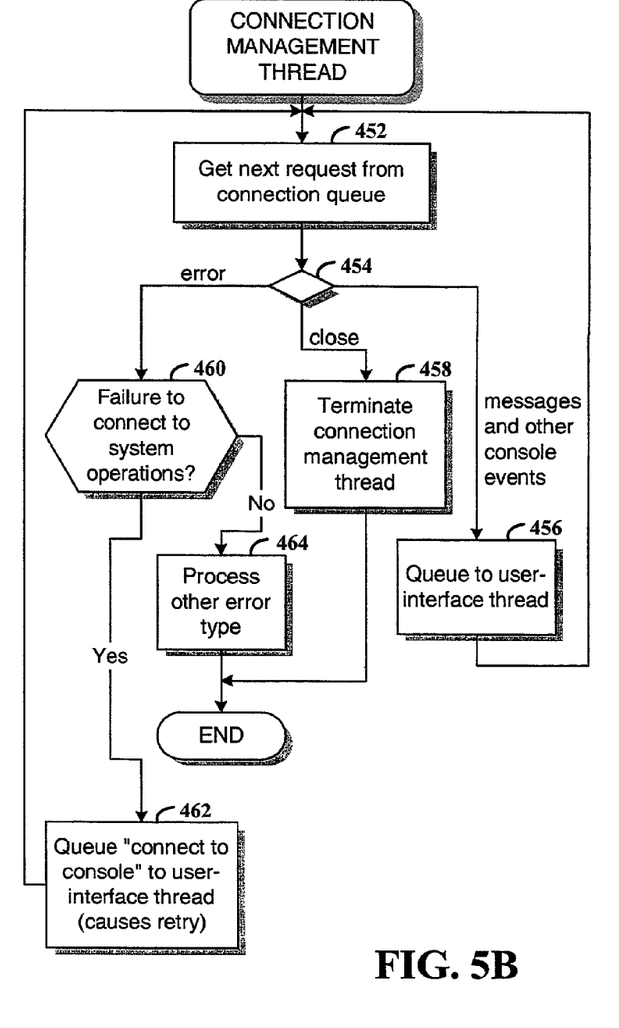
FIG. 5B is a flowchart of a process that implements the connection management thread.
Figure 6:
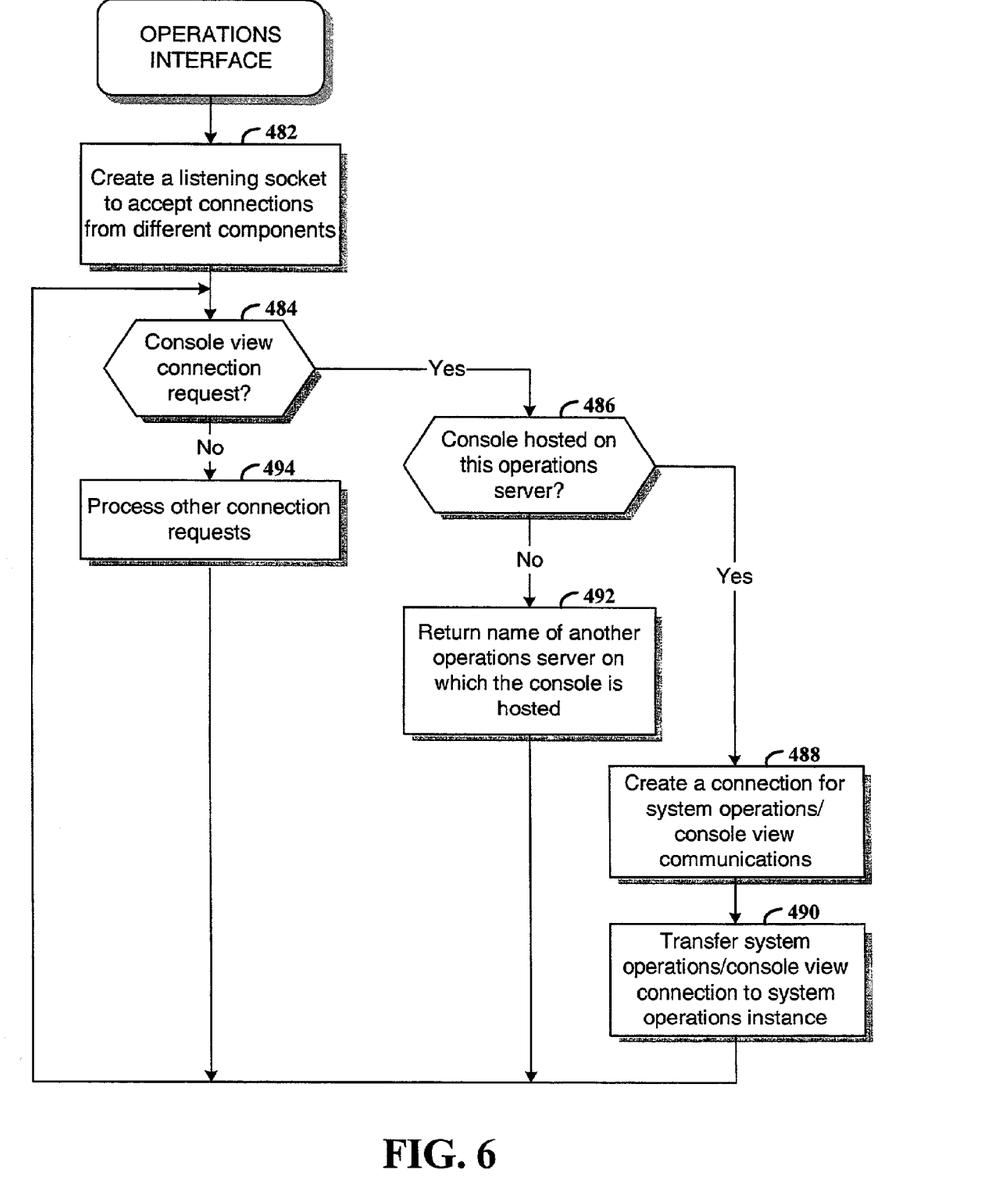
FIG. 6 is a flowchart of a process that implements the operations interface.

FIG. 5B is a flowchart of a process that implements the connection management thread. The connection management thread manages the connection and transfer of messages between an instance of the console view and a connected instance of the system operations program. At step 452, the process gets a request from the connection management queue, and decision step 454 directs the process in response to the type of the request. For messages and other events received from the host partition via the instance of the system operations program and events generated by the system operations program, the process is directed to step 456 where the message or event is queued to the user-interface thread for processing. The user interface thread processes messages and events according to the message and event types and consistent with the display characteristics specified by the associated configuration data (e.g., 202-1, FIG. 2).

For a connection management request to close the connection between the instance of the console view and the instance of the system operations program, the process is directed to step 458. The connection management thread is terminated to end the connection.

If an error is detected by or reported to the connection management thread, the process is directed to decision step 460. A failure by the connection management thread to connect to an operations interface results in the process being directed to step 462. At step 462, a 'connect to console' request is queued to the user-interface thread to initiate a retry. Other types of errors are processed at step 464. For example, the console view process (FIG. 4) is terminated for errors classified as catastrophic.

FIG. 6 is a flowchart of a process that implements the operations interface. At step 482, a listening socket is created to accept connections from different components, for example, instances of the console view and system operations program. Decision step 484 tests whether a message received on the listen socket is a request from an instance of the console view to connect to a particular instance of the system operations program.

Figure 7:
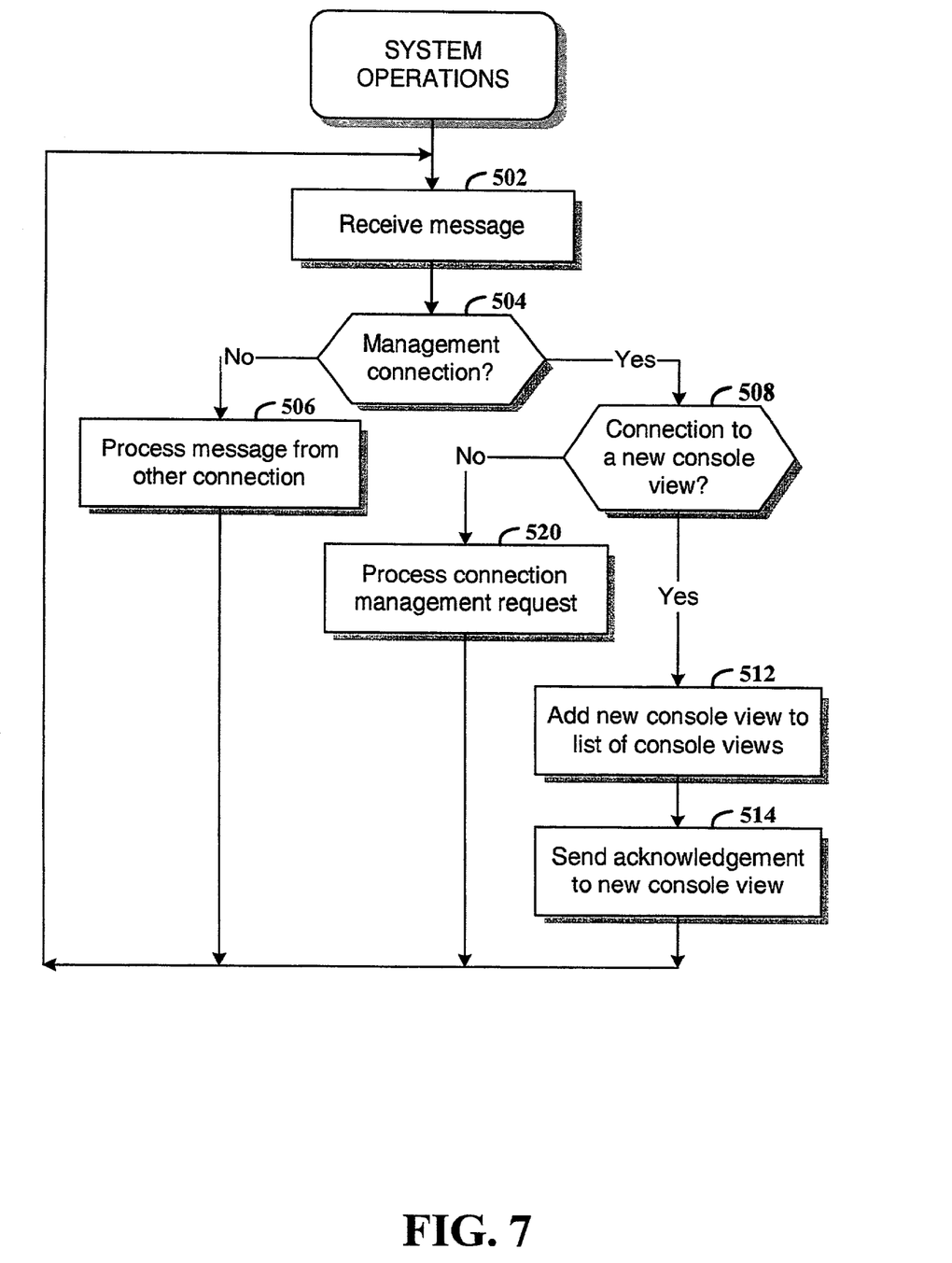
FIG. 7 is a flowchart of a process that implements an instance of the system operations program.

For connection requests, the process is directed to decision step 486. If the requested instance of the system operations program (the "console") is hosted on the operations server (FIG. 1, 104) on which the operations interface is executing, the process is directed to step 488. At step 488, a connection is created for communications between the console view and the system operations program. The connection is then transferred at step 490 to the system operations program. Note that the system operations program returns an acknowledgement to the console view to complete the connection (FIG. 7, 514). Thereafter, the console view and system operations program communicate over this connection. The process then returns to decision step 484 to process the next message received over the listening socket.

Decision step 486 directs the process to step 492 when the requested system operations program (the "console") is not hosted on this operations server. The operations interface notifies the console view process of another operations server on which the console is hosted or that it cannot be found. The process then returns to decision step 484 to process the next message received over the listening socket.

Decision step 484 directs the process to step 494 for other types of requests. For example, the operations server object (FIG. 1, 117) requests connection and eventually requests the creation and activation of consoles; the console (FIG. 1, 118) requests connection back once instantiated in order to receive management requests such as view connects; and connection requests from a console management application (not shown). The process then returns to decision step 484 to process the next message received over the listening socket.

FIG. 7 is a flowchart of a process that implements an instance of the system operations program. The system operations program generally manages message transfer between one or more instances of the console view and a logical console object (FIG. 1, 116). At step 502, the process receives a message, from the console view, the logical console object or the operations interface. Decision step 504 tests whether the message is a connection management type message, and directs the process to step 506 if not. At step 506, the message is processed in accordance with its type. For example, messages originating from a host partition are transmitted to each connected console view, and messages containing commands from an instance of the console view are transmitted to the logical console object.

Decision step 504 directs the process to decision step 508 if the message is a connection management type. If the message is a connection to a new instance of the console view (transferred from the operations interface 120), decision step 508 directs the process to step 512. At step 512 an identifier for the new console view and its connection are added to a list of console views. At step 514, the system operations program sends an acknowledgment message to the new console view and returns control to step 502 to receive another message. When the new console view responds with an initialization message, the system operations program receives the message at step 502. Decision step 504 directs the process to step 506 for non-connection management messages. In response to an initialization message, the system operations program sends the most recently received messages from the host partition to the new console view. Thus, the system operations program maintains a buffer of recent messages from the host partition.

If the connection management message is other than a connection to a new console view, the message is processed according to the type of message (520). These messages contain events that are used to manage the console. Example console management messages signal re-initialization of the console and any connected views and signal termination of the console.

Accordingly, the present invention provides, among other aspects, a method and apparatus for operating a data processing system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for operating a data processing system, the data processing system arranged to host an operating system that is coupled to a management interface processor, wherein the management interface processor is coupled to a network having a plurality of computer systems coupled thereto, comprising:
 initiating on one or more selected ones of the computer systems a plurality of instances of an independently operable console view;
 instantiating on the management interface processor a plurality of logical console objects;
 initiating on a plurality of the computer systems a plurality of instances of a system operations program, wherein the management interface processor is implemented on a computer system other than the selected ones of the computer systems on which the one or more instances of the system operations program are initiated;
 coupling, via the network, the instances of the system operations program to respective logical console objects;
 initiating on one or more selected ones of the computer systems an operations interface program;
 receiving at the operations interface program connection requests from at least two instances of the console view;
 creating respective connections between the operations interface program and the at least two instance of the console view;
 transferring the respective connections with the at least two instances of the console view from the operations interface program to an instance of the system operations program; and
 transmitting data received by the instance of the system operations program from the at least two instances of the console view, from the instance of the system operations program to the respectively coupled logical console object, and transmitting data received by the instance of the system operations program from the logical console object to the at least two instances of the console view.

2. The method of claim 1, further comprising displaying data received at an instance of a console view in a manner consistent with a first set of configuration parameters associated with the instance of the console view.

3. The method of claim 1, further comprising:
 selecting a subset of data from data received at an instance of a console view as a function of a second set of configuration parameters associated with the instance of the console view; and
 displaying the subset of data at the instance of the console view.

4. The method of claim 1, wherein at least one of the one or more instances of the console view executes on a computer system other than the computer system on which the coupled instance of the system operations program executes.

5. An apparatus for operating a data processing system, the data processing system arranged to host an operating system that is coupled to a management interface processor, wherein the management interface processor is coupled to a network having a plurality of computer systems coupled thereto, comprising:
 means for initiating on one or more selected ones of the computer systems a plurality of instances of an independently operable console view;
 means for instantiating on the management interface processor a plurality of logical console objects;
 means for initiating on a plurality of the computer systems a plurality of instances of a system operations program, wherein the management interface processor is implemented on a computer system other than the selected ones of the computer systems on which the one or more instances of the system operations program are initiated;
 means for coupling, via the network, the instances of the system operations program to respective logical console objects;
 means for initiating on one or more selected ones of the computer systems an operations interface program;
 means for receiving at the operations interface program connection requests from at least two instances of the console view;
 means for creating respective connections between the operations interface program and the at least two instances of the console view;
 means for transferring the respective connections with the at least two instances of the console view from the operations interface program to an instance of the system operations program; and
 means for transmitting data received by the instance of the system operations program from the at least two instances of the console view, from the instance of the system operations program to the respectively coupled logical console object, and transmitting data received by the instance of the system operations program from the logical console object to the at least two instances of the console view.

6. A computer-implemented method for operating a partitioned data processing system, each partition including a processor arrangement hosting an operating system which is coupled to a management interface processor, wherein the management interface processor is coupled to a network having one or more computer systems coupled thereto, comprising:
 initiating on one or more selected ones of the computer systems a plurality of instances of an independently operable console view;
 instantiating on the management interface processor a plurality of logical console objects, each coupled to a selected one of the partitions;
 initiating on a plurality of the computer systems a plurality of instances of a system operations program, wherein the management interface processor is implemented on a computer system other than the selected ones of the computer systems on which the one or more instances of the system operations program are initiated;
 coupling, via the network, the instances of the system operations program to respective logical console objects;
 initiating on one or more selected ones of the computer systems an operations interface program;
 receiving at the operations interface program connection requests from at least two instances of the console view;
 creating respective connections between the operations interface program and the at least two instances of the console view;

transferring the respective connections with the at least two instances of the console view from the operations interface program to an instance of the system operations program; and transmitting data received by the instance of the system operations program from the at least two instances of the console view, from the instance of the system operations program to the respectively coupled logical console object, and transmitting data received by the instance of the system operations program from the logical console object to the at least two instances of the console view.

7. The method of claim 6, further comprising displaying data received at an instance of a console view in a manner consistent with a first set of configuration parameters associated with the instance of the console view.

8. The method of claim 6, further comprising:
selecting a subset of data from data received at an instance of a console view as a function of a second set of configuration parameters associated with the instance of the console view; and
displaying the subset of data at the instance of the console view.

9. The method of claim 6, wherein at least one of the one or more instances of the console view executes on a computer system other than the computer system on which the coupled instance of the system operations program executes.

10. A computing arrangement for operating a data processing system, comprising:
a data processing system hosting an operating system;
a network;
a management interface processor coupled to the data processing system and coupled to the network, wherein the management interface processor is implemented on a computer system and hosts a plurality of logical console objects, each logical console object coupled to the operating system;
a plurality of operations server computer systems coupled to the network and hosting a plurality of instances of a system operations program, each instance of the system operations program coupled to a respective logical console object via the network, wherein the server computer system is a computer system other than the computer system of the management interface processor;
a plurality of display stations coupled to the network hosting a plurality of independently operable instances of a console view, each instance of the console view coupled, via the network, to a selected instance of the system operations program and configured to provide a user interface for operating the data processing system, wherein the system operations program is configured to transmit data received from a console view to a respectively coupled logical console object and transmit data received from a logical console object to one or more instances of a console view, wherein at least two instances of the console view are coupled to a single instance of the system operations program.

11. The arrangement of claim 10, wherein each instance of the console view is configured to display data received in a manner consistent with a first respective set of configuration parameters associated with the instance of the console view.

12. The arrangement of claim 10, wherein each instance of the console view is configured to select a subset of data from data received as a function of a second respective set of configuration parameters associated with the instance of the console view and display the subset of data.

13. A computing arrangement for operating a data processing system, comprising:
a data processing system including a plurality of partitions, each partition including a processor arrangement hosting an operating system;
a network;
a management interface processor coupled to the data processing system and coupled to the network, wherein the management interface processor is implemented on a computer system and hosts a plurality of logical console objects, each logical console object coupled to a respective partition;
a plurality of operations server computer systems coupled to the network and each hosting an operations interface program and at least one of a plurality of instances of a system operations program, and each instance of the system operations program coupled to a respective logical console object via the network, wherein the server computer system is a computer system other than the computer system of the management interface processor;
a plurality of display stations coupled to the network and hosting a plurality of independently operable instances of a console view, each instance of the console view coupled, via the network, to a selected instance of the system operations program and configured to provide a user interface for operating the data processing system, wherein at least two instances of the console view are coupled to a single instance of the system operations program; and
wherein the operations interface program is configured to receive connection requests from the instances of the console views, create respective connections between the operations interface program and instances of the console views in response to the connection requests, and transfer connections with instances of the console views from the operations interface program to instances of the system operations program, and each instance of the system operations program is configured to transmit data received from a connected console view to a respectively coupled logical console object and transmit data received from the logical console object to each connected instance of a console view.

14. The arrangement of claim 13, wherein each instance of the console view is configured to display data received in a manner consistent with a first respective set of configuration parameters associated with the instance of the console view.

15. The arrangement of claim 13, wherein each instance of the console view is configured to select a subset of data from data received as a function of a second respective set of configuration parameters associated with the instance of the console view and display the subset of data.

16. A method for operating a data processing system, comprising:
configuring the data processing system into at least two partitions, each partition including a processor arrangement hosting an operating system, and each operating system coupled to a management interface processor of the data processing system;
initiating a plurality of instances of an independently operable console view on a plurality of computer systems coupled to the management interface processor;

initiating at least two instances of a system operations program on at least two of the computer systems, respectively, and coupling each instance of the system operations program to a respective partition, wherein the management interface processor is implemented on a computer system other than the at least two computer systems on which the at least two instances of the system operations program are initiated;

initiating an operations interface program on each of the at least two computer systems having an instance of the system operations program;

receiving at the operations interface program connection requests from the instances of the console view, wherein each connection request specifies an instance of the system operations program;

in response to a connection request that specifies an instance of the system operations program that is not hosted on the computer system hosting the operations interface program at which the connection request was received, returning to the instance of the console view that sent the connection request, a code that identifies the one of the computer systems that hosts the instance of the system operations program specified in the connection request;

in response to a connection request that specifies an instance of the system operations program that is hosted on the computer system hosting the operations interface program at which the connection request was received, creating a connection between the operations interface program and the instance of the console view transferring each connection between an instance of the console view and an operations interface program to an instance of the system operations program specified in the connection request from the console view; and transmitting between each instance of a console view and the connected instance of the system operations program, data from the partition coupled to the instance of the system operations program and data from the console view;

wherein at least two instances of the console view have connections to a single instance of the system operations program.

17. The method of claim 16, further comprising displaying data received at an instance of a console view in a manner consistent with a first set of configuration parameters associated with the instance of the console view.

18. The method of claim 16, further comprising:
selecting a subset of data from data received at an instance of a console view as a function of a second set of configuration parameters associated with the instance of the console view; and displaying the subset of data at the instance of the console view.

* * * * *